H. F. BASCOM.

WATER TUBE BOILER.

APPLICATION FILED SEPT. 28, 1912.

Reissued Dec. 31, 1912.

13,501.

2 SHEETS—SHEET 1.

Witnesses:
Geo. E. Chenery
Charles A. Jones.

Harry F. Bascom Inventor
By his Attorney
Gifford H. Bull

H. F. BASCOM.

WATER TUBE BOILER.

APPLICATION FILED SEPT. 28, 1912.

Reissued Dec. 31, 1912.

13,501.

2 SHEETS—SHEET 2.

Witnesses:
Geo. L. Cheney
Charles S. Jones.

Inventor
Harry F. Bascom
By his Attorney
Gifford Bull

UNITED STATES PATENT OFFICE.

HARRY F. BASCOM, OF ALLENTOWN, PENNSYLVANIA.

WATER-TUBE BOILER.

13,501. Specification of Reissued Letters Patent. Reissued Dec. 31, 1912.

Original No. 1,035,677, dated August 13, 1912, Serial No. 601,155. Application for reissue filed September 28, 1912. Serial No. 722,969.

*To all whom it may concern:*

Be it known that I, HARRY F. BASCOM, a citizen of the United States, residing at Allentown, in the county of Lehigh and State of Pennsylvania, have invented a new and useful Water-Tube Boiler, of which the following is a specification.

It is the object of this invention to provide a means whereby access may be had to a boiler structure, for the purpose of cleaning the tubes and the drums thereof, without interfering with the circulation of products of combustion about the tubes and the drums.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
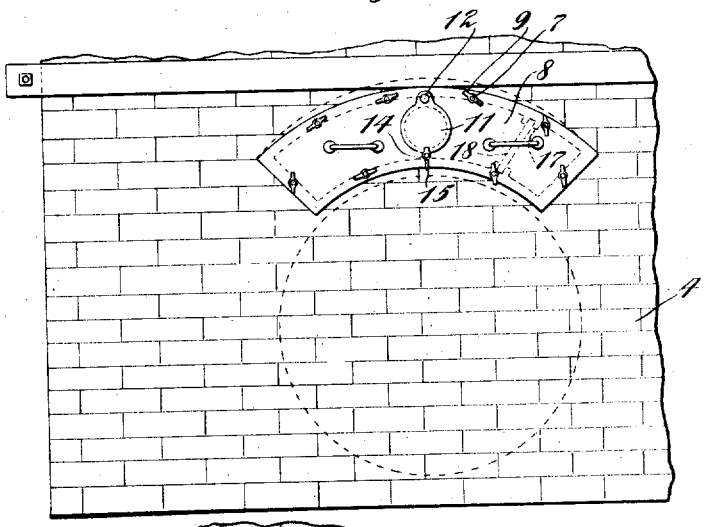
Figure 2:
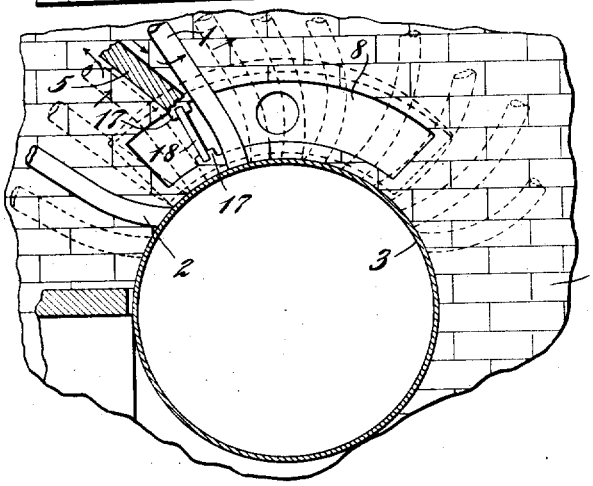
Figure 3:
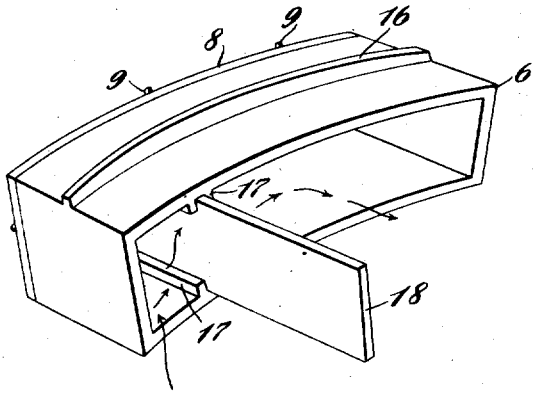
Figure 4:
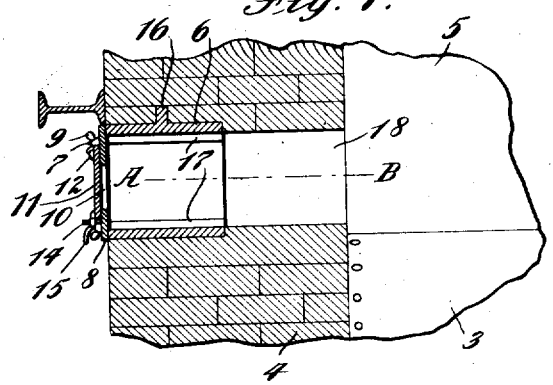

In the drawings,—Figure 1 is a front elevation of a fragment of an end wall of a boiler, equipped with the device of my invention; Fig. 2 is a rear elevation of a fragment of an end wall of a boiler structure, equipped with the device of my invention, the mud drum being shown in section, and the partition which is above the mud drum being sectioned also, the partition being broken away at its lower edge, in order to disclose a removable plate which constitutes a portion of the invention. Fig. 3 shows the invention in perspective; and Fig. 4 is a vertical section transversely of the end wall of the boiler, the view showing the manner in which the invention is mounted, and how the invention coöperates with the partition and the drum of the boiler.

The device forming the subject matter of this application, is adapted to be employed in connection with boilers of widely different types, but, in order to present a concrete embodiment, I have applied the device to one particular type of boiler, namely, the Sterling boiler, so called, without, of course, limiting the use of the invention to this particular form of boiler.

The particular boiler under consideration, consists of a plurality of upper drums (not shown) united by means of tubes 1 and 2, with a lower drum 3, known as the mud-drum. The end wall of the inclosing structure for the boiler, is denoted by the numeral 4, and in lateral abutment with the end wall 4, is an upright partition 5, and this partition, as clearly shown in Fig. 4 extends downwardly into abutment with the drum 3.

Referring to Fig. 2, and noting the arrows therein, it will be understood that the products of combustion, in this particular type of boiler, move transversely of the boiler structure, about the tubes 2, into contact with the partition 5, the products of combustion passing thence, over the top of the partition 5, and downwardly along the opposite side of the partition, about the tubes 1.

By way of explanation I will state that in boilers generally, and in the type of boiler shown, in particular, the efficiency of the boiler is decreased, by reason of the fact that dust and other foreign matter accumulates about the tubes 1 and 2 in the vicinity of the drums, particularly in the vicinity of the lower mud-drum 3. This invention aims to provide means whereby access may be had readily to a boiler drum, and to the tubes of the boiler, for the purpose of cleaning the same, the device, however, normally interfering in no wise with the circulation of products of combustion about the drums and the tubes. In carrying out the invention, then, an opening is fashioned in the end wall 4 of the boiler structure, about the drum 3. Into this opening is inserted a box-like casing 6, open at its forward and rear ends. The particular form given to this casing, may be varied, but the specific casing shown most clearly in Fig. 3, will be found convenient to use, and inexpensive to manufacture. In its forward edge, the casing 6 is supplied with a plurality of outstanding lugs 7, adapted to extend through a closure 8. Wing nuts 9, or other securing elements adapted to a like end, are mounted upon the lugs 7, to hold the closure in place. At any convenient point in the closure 8, there is an opening 10 (see Fig. 4) this opening being normally closed by means of a door 11 which, if desired, may be pivoted in its uppermost portion to the closure 8, as shown at 12. One of the lugs which outstands from the forward edge of the casing 6, in the present instance, the lug denoted specifically by the numeral 14, carries tail-nut 15, adapted to engage the door 11 to hold the same in closed position.

Extended longitudinally of the casing 6, upon its top, is a reinforcing flange 16, the flange serving to prevent a possible crushing-in of the casing by the superposed weight of the end wall 4 of the boiler structure. Outstanding from the top and bottom of the casing 6, and disposed transversely of the casing, are guides 17, into which a plate 18 may be inserted.

Presupposing that the device is mounted in the end wall 4, as shown in Figs. 1, 2 and 4, when a brief inspection of the drum 3 and the tubes 1 and 2 is desired, the door 11 may be opened. If a thorough cleaning of the tubes and the drum is found to be necessary, the wing nuts 9 may be removed, permitting the closure 8 to be set aside, whereupon the plate 18 may be withdrawn from the guides 17, thus giving easy access to the tubes and the drum.

The plate 18, when mounted in the guides 17, abuts against the forward end of the partition 5. The reason why the plate 18 is provided, will be clearly understood from an inspection of Figs. 2 and 3. Noting, at present, Fig. 3, it will be seen that, in the absence of the plate 18, the products of combustion, following the arrows in Fig. 3, would pass into the casing 6, laterally around the forward edge of the partition 5, thus putting an end to the circulation upon the opposite sides of the partition 5, as shown by the arrows in Fig. 2. When the plate is in terminal abutment with the partition 5, as shown in Fig. 4, it will be seen that the closure 8 serves as a means for holding the plate 18 in place. Obviously, the removal of the plate 18 permits the operator to examine and to clean the tubes which are located upon opposite sides of the partition 5.

Although, in Fig. 4, the casing 6 is shown as not extending entirely through the end wall 4, and although in Fig. 3, the plate 18 protrudes inwardly beyond the casing 6, it will be readily understood that these details may be altered, so that the casing 6, the plate 18, the end wall 4, and the partition 5, will all coöperate to give the desired access to the tubes and the drum, without interfering with the circulation of the products of combustion through the boiler structure.

It is to be noted that the improvement herein disclosed, is adapted not only for the purposes of cleaning the drums and the tubes, but, as well, for determining, by inspection, whether any of the tubes are leaking or broken.

Having thus described the invention, what is claimed is:—

1. In a device of the class described, an end wall having an opening; a partition extended across the opening and abutting against the wall; an imperforate plate removably held in the opening longitudinally of the opening and intermediate the sides of the opening, the plate abutting against the partition to prevent a cross draft through the opening; and a closure for the outer end of the opening, with which closure the plate engages.

2. In a device of the class described, an end wall having an opening; a drum; a partition extended across the opening and into abutment with the wall and with the drum; an imperforate plate removably held in the opening, longitudinally of the opening, and intermediate the sides of the opening, the plate abutting against the partition to prevent a cross draft through the opening; and a closure for the outer end of the opening, with which closure the plate engages.

3. In a device of the class described, a drum; an end wall positioned adjacent the drum and having an opening; a partition in abutment with the end wall and the drum; a casing adapted to be inserted into the opening in the end wall, the opening and the casing being extended beyond both sides of the partition; a plate insertible into the casing, to abut against the partition and to prevent a cross draft through the opening; and a removable closure for the casing, serving at once to give access to the casing, and as a means for holding the plate in abutment with the partition.

4. In a device of the class described, an end wall having an opening; a partition extended across the opening and abutting against the wall; an imperforate plate held in the opening longitudinally of the opening and intermediate the sides of the opening, the plate abutting against the partition to prevent a cross draft through the opening; and a closure for the outer end of the opening, with which closure the plate engages.

5. In a device of the class described, an end wall having an opening; a drum; a partition extending across the opening and into abutment with the wall and with the drum; an imperforate plate held in the opening, longitudinally of the opening, and intermediate the sides of the opening, the plate abutting against the partition to prevent a cross draft through the opening; and a closure for the outer end of the opening, with which closure the plate engages.

6. In a device of the class described, a drum; an end wall positioned adjacent the drum and having an opening; a partition in abutment with the end wall and the drum; a casing adapted to be inserted into the opening in the end wall, the opening and the casing being extended beyond both sides of the partition; a plate within the casing, to abut against the partition and to prevent a cross draft through the opening; and a removable closure for the casing, serving at once to give access to the casing, and as a means for holding the plate in abutment with the partition.

7. A boiler having a series of generating tubes, a partition to direct the products of combustion about said tubes, a wall having a cleaning opening, said partition extending across said opening, and a plate in said opening abutting against said wall to prevent a cross draft through the opening around the lower end of the partition.

8. A boiler having a series of generating tubes, a partition to direct the products of combustion about said tubes, a wall having a cleaning opening extending on both sides of said partition, and a plate in said opening so placed relative to the partition as to prevent a cross draft through the opening around the lower end of the partition.

9. A boiler having a series of generating tubes, a drum into which the lower ends of the tubes are expanded, a partition extending from said drum for directing the products of combustion, a wall having a cleaning opening extending on both sides of said partition, and a plate in said opening so placed relative to the partition as to prevent a cross draft through the opening around the lower end of the partition.

In testimony whereof I have hereunto signed my name in the presence of two subscribing witnesses.

HARRY F. BASCOM.

Witnesses:
M. E. McNinch,
C. G. Heybrun.